(12) United States Patent
Enke

(10) Patent No.: US 10,942,528 B2
(45) Date of Patent: *Mar. 9, 2021

(54) RETURN PATH CONFIGURATION FOR REMOTE CONTROLLED AERIAL VEHICLE

(71) Applicant: GoPro, Inc., San Mateo, CA (US)

(72) Inventor: Joseph Anthony Enke, Campbell, CA (US)

(73) Assignee: GoPro, Inc., San Mateo, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 16/214,595

(22) Filed: Dec. 10, 2018

(65) Prior Publication Data

US 2019/0146488 A1 May 16, 2019

Related U.S. Application Data

(63) Continuation of application No. 15/391,730, filed on Dec. 27, 2016, now Pat. No. 10,185,318, which is a
(Continued)

(51) Int. Cl.
*G05D 1/00* (2006.01)
*G05D 1/10* (2006.01)
(Continued)

(52) U.S. Cl.
CPC ........... *G05D 1/106* (2019.05); *B64C 39/024* (2013.01); *G01C 23/00* (2013.01); *G05D 1/0022* (2013.01);
(Continued)

(58) Field of Classification Search
CPC .. G05D 1/0044; G05D 1/0022; G05D 1/0038; G05D 1/101; G05D 1/102;
(Continued)

(56) References Cited

U.S. PATENT DOCUMENTS

D189,462 S 12/1960 Vogt
D197,038 S 12/1963 Howard
(Continued)

FOREIGN PATENT DOCUMENTS

CN 201816723 U 5/2011
CN 103025609 A 4/2013
(Continued)

OTHER PUBLICATIONS

3D Robotics, Inc., 'IRIS Operational Manual,' Oct. 16, 2013, 35 Pages, [online] [Retrieved on Apr. 29, 2016] Retrieved from the Internet <URL:https://3dr.com/wp-content/uploads/2013/10/operation-manual-compressed.pdf>.
(Continued)

*Primary Examiner* — Yuen Wong
(74) *Attorney, Agent, or Firm* — Young Basile Hanlon & MacFarlane, P.C.

(57) ABSTRACT

Disclosed is a configuration to control automatic return of an aerial vehicle. The configuration stores a return location in a storage device of the aerial vehicle. The return location may correspond to a location where the aerial vehicle is to return. One or more sensors of the aerial vehicle are monitored during flight for detection of a predefined condition. When a predetermined condition is met a return path program may be loaded for execution to provide a return flight path for the aerial vehicle to automatically navigate to the return location.

20 Claims, 13 Drawing Sheets

Related U.S. Application Data continuation of application No. 15/134,284, filed on Apr. 20, 2016, now Pat. No. 9,557,738.

(60) Provisional application No. 62/302,114, filed on Mar. 1, 2016, provisional application No. 62/279,621, filed on Jan. 15, 2016, provisional application No. 62/199,356, filed on Jul. 31, 2015, provisional application No. 62/150,703, filed on Apr. 21, 2015.

(51) Int. Cl.

| | |
|---|---|
| *B64C 39/02* | (2006.01) |
| *G07C 5/08* | (2006.01) |
| *G08G 5/00* | (2006.01) |
| *G08G 5/04* | (2006.01) |
| *H04L 29/08* | (2006.01) |
| *G01C 23/00* | (2006.01) |
| *H04B 7/185* | (2006.01) |
| *H04W 84/04* | (2009.01) |
| *H04W 84/12* | (2009.01) |

(52) U.S. Cl.
CPC ......... *G05D 1/0038* (2013.01); *G05D 1/0044* (2013.01); *G05D 1/0088* (2013.01); *G05D 1/102* (2013.01); *G07C 5/08* (2013.01); *G08G 5/006* (2013.01); *G08G 5/0013* (2013.01); *G08G 5/0021* (2013.01); *G08G 5/0026* (2013.01); *G08G 5/0034* (2013.01); *G08G 5/0039* (2013.01); *G08G 5/0069* (2013.01); *G08G 5/0078* (2013.01); *G08G 5/0086* (2013.01); *G08G 5/0091* (2013.01); *G08G 5/045* (2013.01); *H04L 67/12* (2013.01); *B64C 2201/024* (2013.01); *B64C 2201/027* (2013.01); *B64C 2201/108* (2013.01); *B64C 2201/127* (2013.01); *B64C 2201/141* (2013.01); *B64C 2201/145* (2013.01); *B64C 2201/146* (2013.01); *B64C 2201/18* (2013.01); *B64C 2201/185* (2013.01); *B64C 2201/20* (2013.01); *H04B 7/18504* (2013.01); *H04W 84/042* (2013.01); *H04W 84/12* (2013.01)

(58) Field of Classification Search
CPC ...... G05D 1/0088; H04L 67/12; G01C 23/00; G08G 5/0013; G08G 5/0021; G08G 5/0026; G08G 5/0034; G08G 5/0039; G08G 5/0078; G08G 5/0086; G08G 5/0091; G08G 5/006; G08G 5/045; G08G 5/0069; G07C 5/08; B64C 2201/185; B64C 2201/18; B64C 2201/027; B64C 2201/108; B64C 2201/20; B64C 2201/145; B64C 2201/127; B64C 2201/146; B64C 2201/141; B64C 2201/024; B64C 39/024; H04B 7/18504; H04W 84/042; H04W 84/12

See application file for complete search history.

(56) References Cited

U.S. PATENT DOCUMENTS

| | | | |
|---|---|---|---|
| D349,520 S | 8/1994 | Iwakami | |
| 5,465,142 A * | 11/1995 | Krumes | G01S 17/933 |
| | | | 340/946 |
| D367,895 S | 3/1996 | Goto | |
| D383,800 S | 9/1997 | Ishizaki | |
| D411,863 S | 7/1999 | Chan | |
| D448,810 S | 10/2001 | Goto | |
| D460,450 S | 7/2002 | Goto | |
| D465,196 S | 11/2002 | Dammar | |
| D547,763 S | 7/2007 | Hayes | |
| 7,376,494 B2 | 5/2008 | Arnouse | |
| D603,457 S | 11/2009 | Julskjer | |
| D628,658 S | 12/2010 | Wurm | |
| 7,876,359 B2 | 1/2011 | Von | |
| D631,922 S | 2/2011 | Kang | |
| D637,241 S | 5/2011 | Cheng | |
| D657,005 S | 4/2012 | Zahornacky | |
| 8,265,808 B2 | 9/2012 | Garrec | |
| 8,292,215 B2 | 10/2012 | Olm | |
| D672,397 S | 12/2012 | Wai | |
| D691,514 S | 10/2013 | Wang | |
| D710,452 S | 8/2014 | Barajas | |
| D710,453 S | 8/2014 | Barajas | |
| D710,454 S | 8/2014 | Barajas | |
| 8,967,029 B1 | 3/2015 | Calvert | |
| 8,973,861 B2 | 3/2015 | Zhou | |
| 8,989,922 B2 | 3/2015 | Jones | |
| 9,061,763 B1 | 6/2015 | Christensen | |
| 9,099,902 B2 | 8/2015 | Chen | |
| D741,751 S | 10/2015 | Klaptocz | |
| D741,779 S | 10/2015 | Hsiao | |
| 9,164,506 B1 | 10/2015 | Zang | |
| 9,280,038 B1 | 3/2016 | Pan | |
| D768,539 S | 10/2016 | Lee | |
| 9,501,061 B2 | 11/2016 | Canoy | |
| 2007/0236366 A1* | 10/2007 | Gur | G06K 9/00 |
| | | | 340/945 |
| 2009/0008499 A1 | 1/2009 | Shaw | |
| 2011/0001001 A1 | 1/2011 | Bryant | |
| 2012/0065881 A1 | 3/2012 | McIver | |
| 2012/0083945 A1 | 4/2012 | Oakley | |
| 2012/0121412 A1 | 5/2012 | Hoover | |
| 2012/0283897 A1 | 11/2012 | Barraci | |
| 2014/0061376 A1 | 3/2014 | Fisher | |
| 2014/0117149 A1 | 5/2014 | Zhou | |
| 2014/0249693 A1* | 9/2014 | Stark | B64C 39/024 |
| | | | 701/2 |
| 2014/0263823 A1 | 9/2014 | Wang | |
| 2014/0277854 A1* | 9/2014 | Jones | G05D 1/102 |
| | | | 701/3 |
| 2014/0339355 A1 | 11/2014 | Olm | |
| 2015/0012154 A1 | 1/2015 | Senkel | |
| 2015/0051755 A1 | 2/2015 | Erhart | |
| 2015/0060606 A1 | 3/2015 | Wang | |
| 2015/0129711 A1 | 5/2015 | Caubel | |
| 2015/0210388 A1 | 7/2015 | Criado | |
| 2015/0259066 A1 | 9/2015 | Johannesson | |
| 2015/0274309 A1 | 10/2015 | Shi | |
| 2015/0321755 A1 | 11/2015 | Martin | |
| 2015/0336670 A1 | 11/2015 | Zhang | |
| 2016/0001879 A1 | 1/2016 | Johannesson | |
| 2016/0031275 A1 | 2/2016 | Monroe | |
| 2016/0068261 A1 | 3/2016 | Niederberger | |
| 2016/0159471 A1 | 6/2016 | Chan | |
| 2016/0176520 A1 | 6/2016 | Goldstein | |
| 2017/0001721 A1 | 1/2017 | Saika | |
| 2017/0036771 A1 | 2/2017 | Woodman | |

FOREIGN PATENT DOCUMENTS

| | | |
|---|---|---|
| CN | 104386249 A | 3/2015 |
| CN | 303368298 | 9/2015 |
| EP | 2906203 A1 | 8/2015 |
| IS | 711170016 | 1/2009 |

OTHER PUBLICATIONS

DJI Innovations, 'PHANTOM Quick Start Manual V1.2,' 2012, pp. 1-16, [online] [Retrieved on Apr. 29, 2016] Retrieved from the Internet <URL:http://www.rapidonline.com/pdf/595538_an_en_01.pdf>.

DJI Innovations, 'PHANTOM FC40 User Manual,' Mar. 21, 2014, 31 Pages, [online] [Retrieved on Apr. 29, 2016] Retrieved from the Internet <URL:http://dl.djicdn.com/downloads/phantom_fc40/en/Phantom_FC4O_User_Manual_v1.06_en.pdf>.

(56) References Cited

OTHER PUBLICATIONS

Fantomas, 'Guide to the Phantom 2 Vision & Vision+,' Dec. 4, 2014, 49 Pages, [online] [Retrieved on Apr. 29, 2016] Retrieved from the Internet <URL:http://www.droneflyersxom/wp-content/uploads/2014/12/DJI-Phantom-Vision-Summary-Guide.pdf>.
Horizon Hobby, Inc., 'Blade 350 QX Instruction Manual,' 2013, 20 Pages, [online] [Retrieved on Apr. 29, 2016] Retrieved from the Internet <URL:http://www.bladehelis.com/ProdInfo/Files/BLH7800-Manual_EN.pdf>.
HOBBYKING.COM, 'NOVA Manual,' 1 page, [online] [Retrieved on Apr. 29, 2016] Retrieved from the Internet <URL:http://www.hobbyking.com/hobbyking/store/uploads/65525800X365809X9.pdf>.
Johnson, M., 'Heli Pilot Review,' DJI-Innovations, Apr. 2013, pp. 22-26, [online] [Retrieved on Apr. 29, 2016] Retrieved from the Internet <URL:http://www.visual-aerials.com/uploads/3/3/9/9/3399523/visual-aerials_rc_heli_phantom_april2013.pdf>.
TBS Discovery, 'TBS Discovery Quadrotor,' ivc.no, Sep. 21, 2014, 33 Pages, [online] [Retrieved on Apr. 29, 2016] Retrieved from the Internet <URL:http://www.team-blacksheep.com/tbs-disco very-manual.pdf>.
PCT International Search Report and Written Opinion for PCT/US16/28508, dated Sep. 6, 2016, 15 Pages.
'Best Drone for GoPro,' Drone by GoPro, Retrieved online on Apr. 27, 2016, 4 pages, Retrieved from the internet <URL:http://dronegopro.org/>.
Office Action for Canadian Patent Application No. CA 169042, dated Jan. 12, 2017, 5 Pages.
Office Action for Russian Design Application No. RU 2016502372, dated Mar. 10, 2017, 4 Pages (With English Translation).
Amazon.com: Parabolic Antenna DJI Signal Booster and Range Extender, review Apr. 2016, https://www.amazon.com/Parabolic-Antenna-Booster-Extender-Advanced/dp/B01- DK4JQNE/ref=cm_cr_arp_d_product_top?ie=UTF8, site visited Sep. 28, 2016.
Office Action for U.S. Appl. No. 15/331,707, dated Jun. 5, 2017, 10 Pages.
European Extended Search Report for 16783799.6 , dated Feb. 14, 2018, 7 pages.
Brown, E., "AirDog auto-follow drone for GoPro smashes Kickstarter targets," Social Business, Jul. 9, 2014, 4 pages, [online] [retrieved on Sep. 22, 2016] Retrieved from the internet <URL:http://www.zdnet.com/article/airdog-auto-follow-drone-for-gopro-smashes-kickstarter-targets/>.
Krassenstein, B., "AirDog, World's First Auto-follow Deon Designed to Track and Record Activities, is Entirely 3D Printed," 3dpring.com, 3DR Holdings, LLS, 12 pages, [online] [retrieved on Sep. 22, 2016] Retrieved from the internet <URL:https://3dprint.com/7193/airdong-drone-3d-print/>.
United States Office Action, U.S. Appl. No. 15/134,284, dated Jul. 13, 2016, 16 pages.

\* cited by examiner

RETURN PATH CONFIGURATION FOR REMOTE CONTROLLED AERIAL VEHICLE

CROSS REFERENCE TO RELATED APPLICATIONS

This application is a continuation of U.S. application Ser. No. 15/391,730, filed Dec. 27, 2016, which is a continuation of U.S. application Ser. No. 15/134,284, filed Apr. 20 2016, now U.S. Pat. No. 9,557,738, which claims the benefit of U.S. Provisional Application No. 62/302,114, filed Mar. 1, 2016, U.S. Provisional Application No. 62/279,621, filed Jan. 15, 2016, U.S. Provisional Application No. 62/199,356, filed Jul. 31, 2015, and U.S. Provisional Application No. 62/150,703, filed Apr. 21, 2015, the contents of each of which is incorporated by reference in its entirety.

FIELD

The disclosure generally relates to return path configurations for a remote controlled aerial vehicle.

BACKGROUND

Description of Art

Remote controlled devices with cameras mounted upon those devices are well known. For example, a remote control road vehicle can be configured to mount a camera on it to capture images as the vehicle is moved about remotely by a user. Similarly, remote controlled aerial vehicles, e.g., quadcopters, have been mounted with cameras to capture aerial images through the camera as a user remotely controls the vehicle.

In some instances it may be desirable to have a remote controlled aerial vehicle return to a particular location or set down quickly. For example, as the aerial vehicle is in flight mechanical issues or environmental constraints may require that the vehicle return back to a predefined location as quickly as possible without undue delay or interference in the return path.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a remote controlled aerial vehicle with camera and mounting configuration. The remote controlled aerial vehicle includes a mounting configuration that secures a camera. The mounting configuration can be removably attachable. Moreover, the camera can be configured so that it may be removably attachable from the mounting configuration and structured to operate as a standalone mount.

Also disclosed is a configuration for a remote controlled aerial vehicle to have a flight path programmed into the remote controlled aerial vehicle and then executed during operation of the vehicle. In operation, the vehicle monitors operational, mechanical, and environmental configurations to determine whether the vehicle can continue on the flight path, make adjustments or return to a predefined location. This configuration may include automating the process of flight adjustments and returns so that the remote controlled aerial vehicle can operate with minimal to no impact on its immediate surroundings.

Example System Configuration

Figure 1:
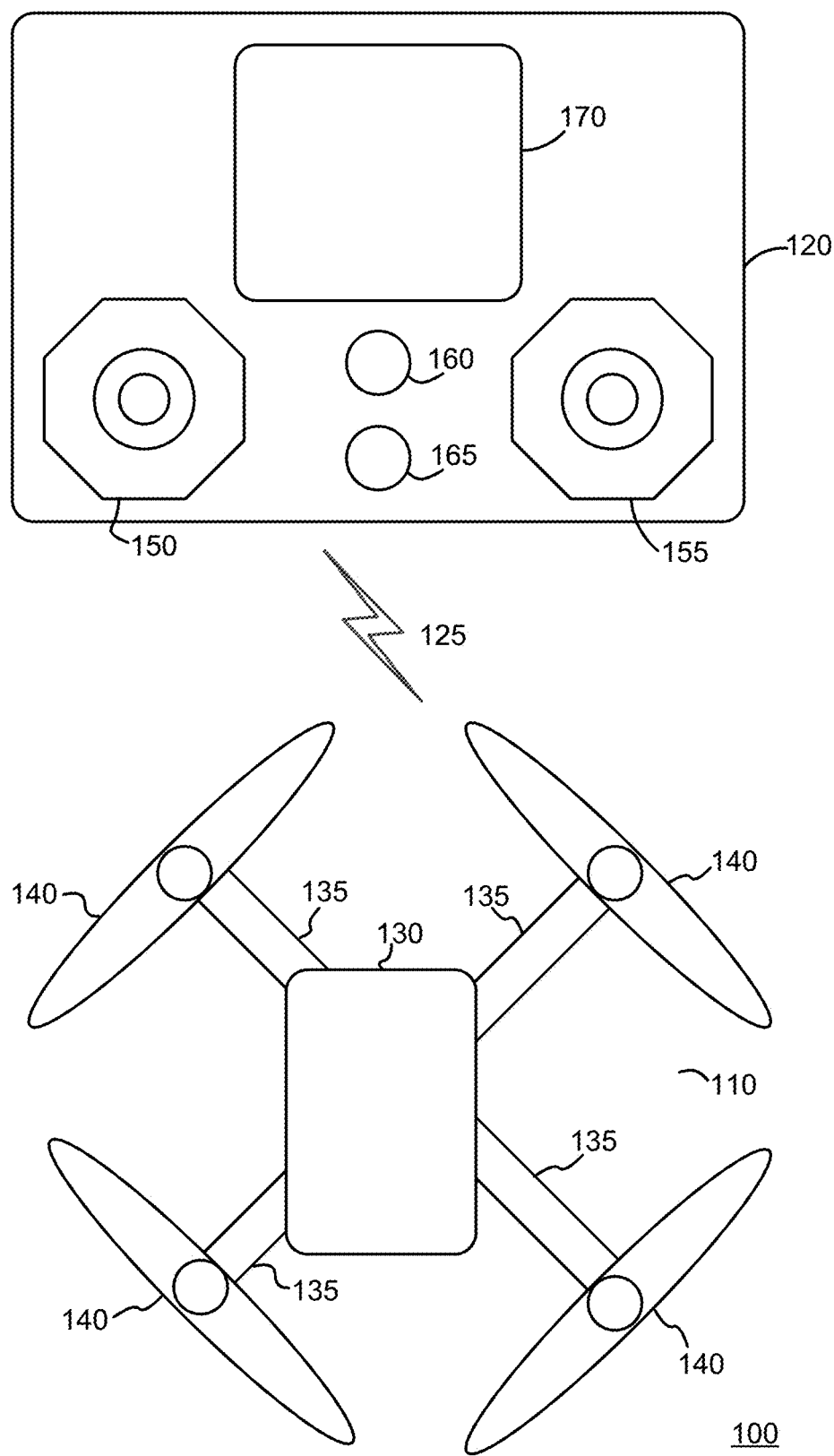
FIG. 1 illustrates an example configuration of remote controlled aerial vehicle in communication with a remote controller.

Turning now to Figure (FIG. 1, it illustrates an example configuration 100 of remote controlled aerial vehicle in communication with a remote controller. The configuration 100 may include a remote controlled aerial vehicle ("aerial vehicle") 110 and a remote controller 120. The aerial vehicle 110 and the remote controller 120 are communicatively coupled through a wireless link 125. The wireless link can be a WiFi link, cellular (e.g., long term evolution (LTE), 3G, 4G, 5G) or other wireless communication link. The aerial vehicle 110 can be, for example, a quadcopter or other multirotor helicopter and may be referenced as a "drone"

The aerial vehicle 110 in this example includes housing 130 for payload (e.g., electronics, storage media, and/or camera), two or more arms 135, and two or more propellers 140. Each arm 135 mechanically couples with a propeller 140 to create a rotary assembly. When the rotary assembly is operational, all the propellers 140 spin at appropriate speeds to allow the aerial vehicle 110 lift (take off), land, hover, and move (forward, backward) in flight.

The remote controller 120 in this example includes a first control panel 150 and a second control panel 155, an ignition button 160, a return button 165 and a display 170. A first control panel, e.g., 150, can be used to control "up-down" direction (e.g. lift and landing) of the aerial vehicle 110. A second control panel, e.g., 155, can be used to control "forward-reverse" direction of the aerial vehicle 110. Each control panel 150, 155 can be structurally configured as a joystick controller and/or touch pad controller. The ignition button 160 can be used to start the rotary assembly (e.g., start the propellers 140). The return (or come home) button 165 can be used to override the controls of the remote controller 120 and transmit instructions to the aerial vehicle 110 to return to a predefined location as further described herein. The ignition button 160 and the return button 165 can be mechanical and/or solid state press sensitive buttons. Each button may be illuminated with one or more light emitting diodes (LED) to provide additional details. For example the LED can switch from one visual state to another to indicate with respect to the ignition button 160 whether the aerial vehicle 110 is ready to fly (e.g., lit green) or not (e.g., lit red) or whether the aerial vehicle 110 is now in an override mode on return path (e.g., lit yellow) or not (e.g., lit red). It also is noted that the remote controller 120 can include other dedicated hardware buttons and switches and those buttons and switches may be solid state buttons and switches.

The remote controller 120 also may include a screen (or display) 170. The screen 170 provides for visual display. The screen 170 can be a touch sensitive screen. The screen 170 also can be, for example, a liquid crystal display (LCD), an LED display, an organic LED (OLED) display or a plasma screen. The screen 170 allow for display of information related to the remote controller 120, such as menus for configuring the remote controller 120 or remotely configuring the aerial vehicle 110. The screen 170 also can display images captured from a camera coupled with the aerial vehicle 110. The aerial vehicle 110 and remote controller 120 are further described below.

Example Remote Controlled Aerial Vehicle

Figure 2:
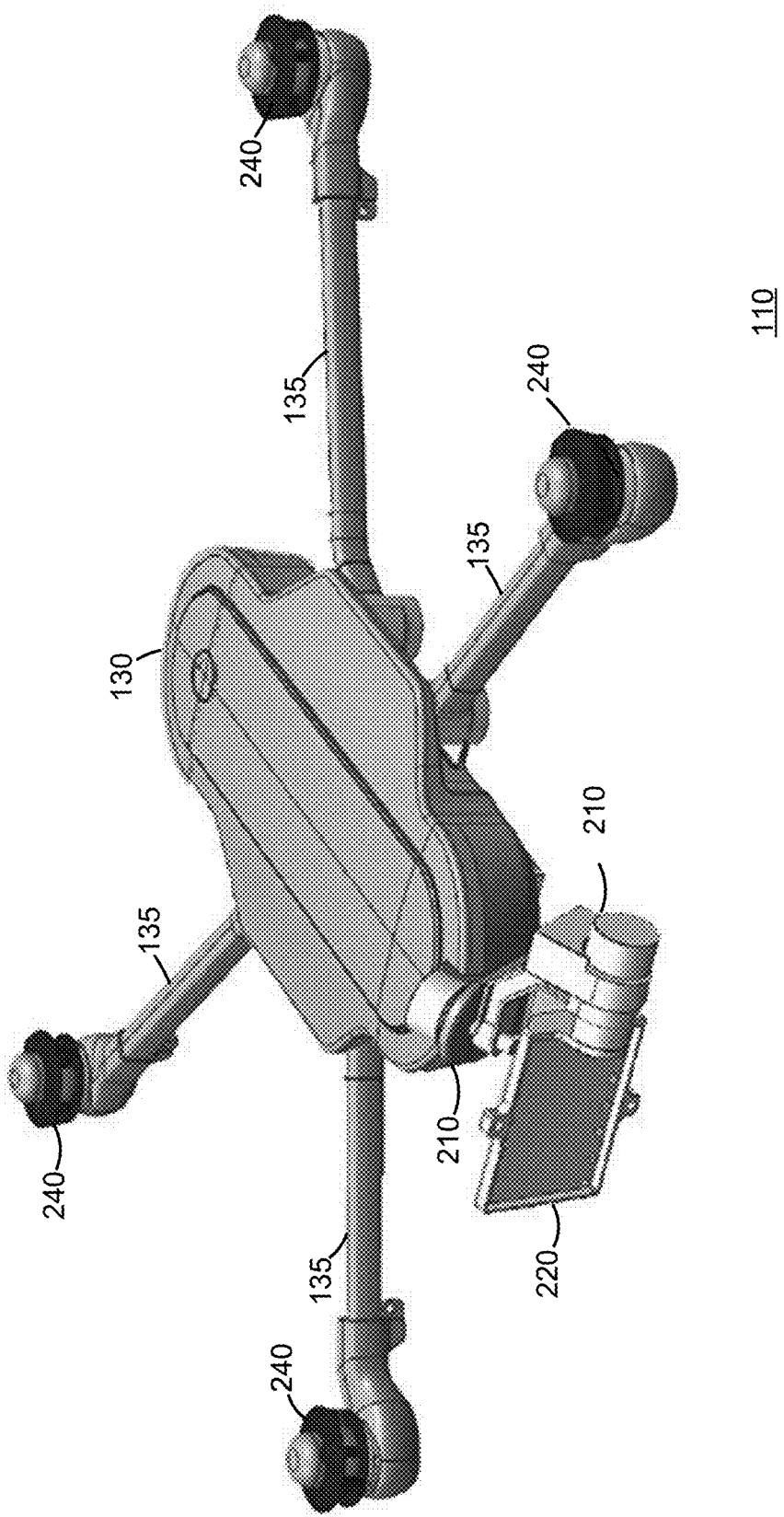
FIG. 2 illustrates an example of a remote controlled aerial vehicle.

Referring now to FIG. 2, it illustrates an example of an example embodiment of the remote controlled aerial vehicle 110. The remote controlled aerial vehicle 110 in this example is shown with the housing 130 and arms 135 of the arm assembly. This example embodiment shows a thrust motor (which may include a rotor) 240 coupled with the end of each arm 130 of the arm assembly, a gimbal 210 and a camera mount 220. The thrust motor 240 couples with the propellers 140 (not shown) to spin the propellers when the motors are operational.

The gimbal 210 may be configured to allow for rotation of an object about an axis. Here, the object is a camera mount 220 to which the gimbal 210 is mechanically coupled. The camera mount 210 may be configured to allow a camera (not shown) to couple (e.g., attach) to it and may include electrical connection points for the coupled camera. The gimbal 210 allows for the camera mount 220 to maintain a particular position so that the camera mounted to it can remain steady as the aerial vehicle 110 is in flight.

Figure 3:
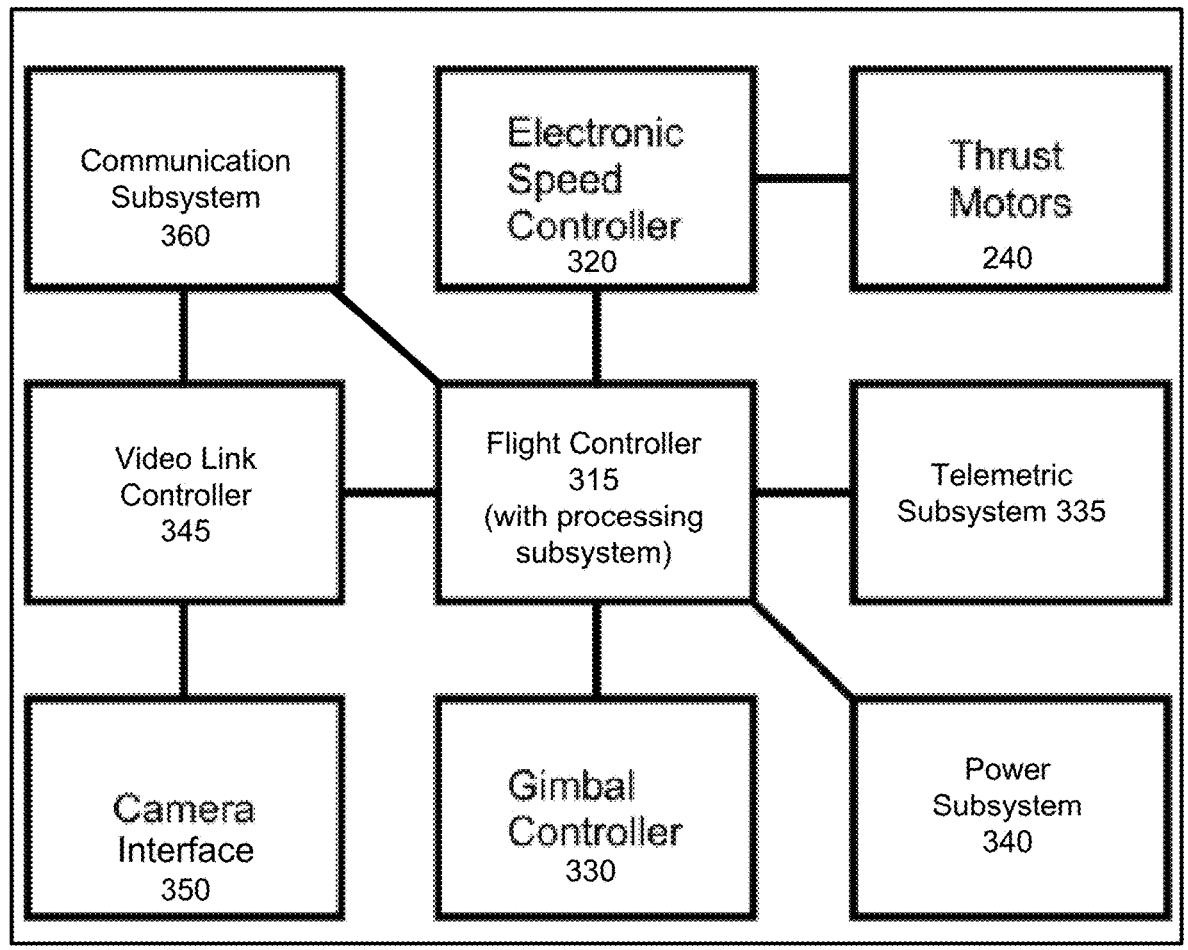
FIG. 3 illustrates an example of a remote controlled aerial vehicle electronics and control systems.

FIG. 3 illustrates an example embodiment of electronics and control (EC) system 310 of the aerial vehicle 110. The EC system 310 may include a flight controller 315, an electronic speed controller 320, one or more thrust motors 240, a gimbal controller 330, a telemetric subsystem 335, a power subsystem 340, a video link controller 345, a camera interface 350, and a long range communication subsystem 360. The components communicate directly or indirectly with each other through a data bus on the aerial vehicle 110.

In one embodiment, the communication subsystem 360 can be a long range WiFi system. It also can include or be another wireless communication system, for example, one based on long term evolution (LTE), 3G, 4G, or 5G mobile communication standards. The communication subsystem 360 also could be configured with a uni-directional RC channel for communication of controls from the remote controller 120 to the aerial vehicle 110 and a separate unidirectional channel for video downlink from the aerial vehicle 110 to the remote controller 120 (or to a video receiver where direct video connection may be desired). The telemetric (or sensor) subsystem 335 may include navigational components, for example, a gyroscope, accelerometer, a compass, a global positioning system (GPS) and/or a barometric sensor. The power subsystem 340 can include a battery pack and a protection circuit module as well as a power control/battery management system. The camera interface 350 can interface with a camera or may include an integrated camera. The integrated camera may be positioned similar to the camera mount 220 and the camera may incorporate a camera mount.

The flight controller 315 of the EC system 310 may communicate with the remote controller 120 through the communication subsystem 360. The flight controller 315 may control the flight related operations of the aerial vehicle 110 by control over the other components such as the electronic speed controller 320 and the telemetric subsystem 335. The flight controller 315 may interface with the gimbal controller 330 to control the gimbal 210 and the video link controller 345 for camera operation control.

The electronic speed controller 320 may be configured to interface with the thrust motors 240 to control the speed and thrust applied to the propellers 140 via the thrust motors 240 (via electronics interface) of the aerial vehicle 110. The video link controller 345 may be configured to communicate with the camera interface 350 to capture and transmit images from a camera to the remote controller 120 (or other device with screen such as a smart phone), e.g., via the communication subsystem 360. The video may be overlaid and/or augmented with other data from the aerial vehicle 110 such as the telemetric (or sensor) data from the telemetric subsystem 335. The power subsystem 340 is configured to manage and supply power to the components of the EC system 310.

Figure 4:
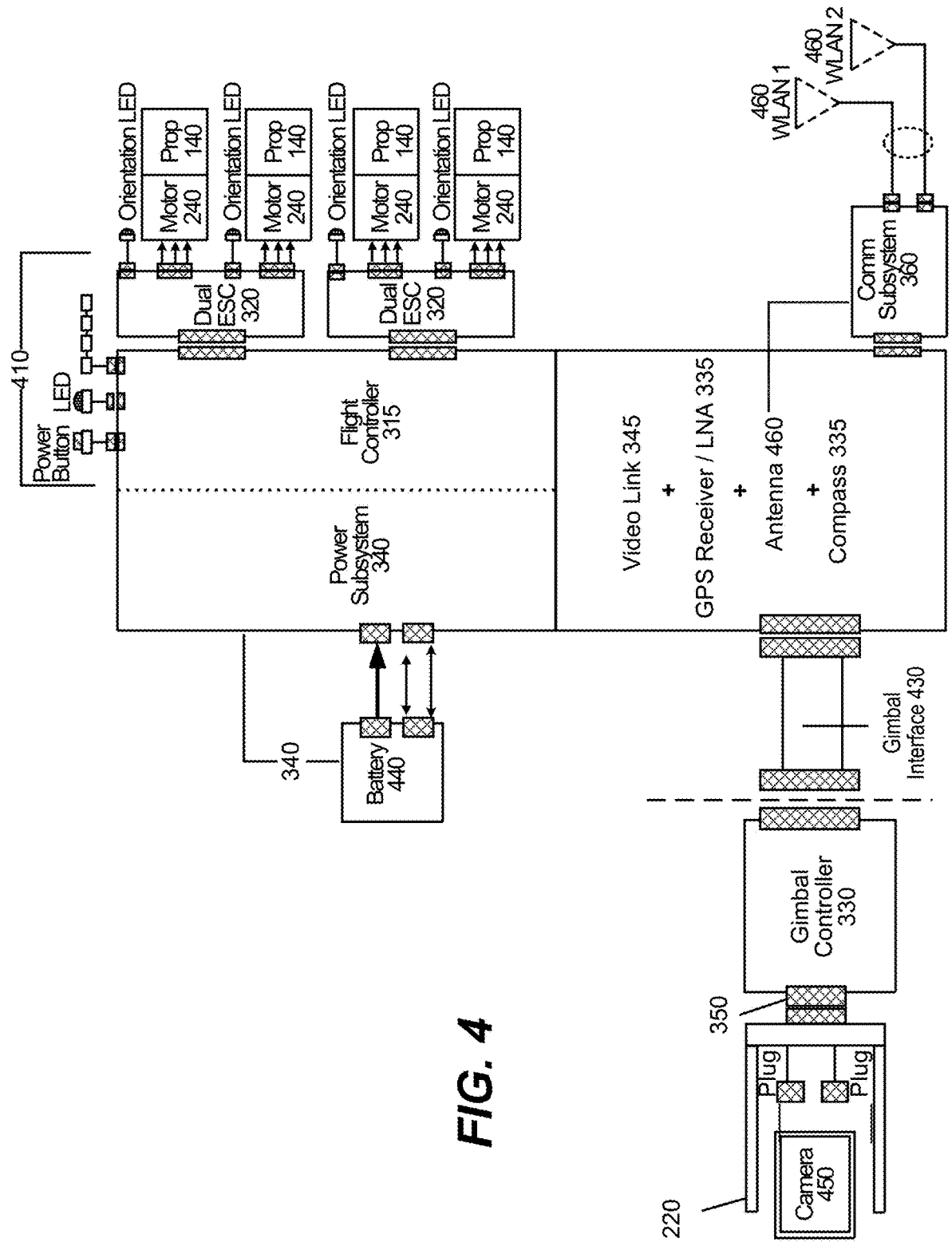
FIG. 4 illustrates an example interconnect architecture of a remote controlled aerial vehicle with a gimbal.

Turning to FIG. 4, it illustrates an example interconnect architecture of the remote controlled aerial vehicle 110 with the gimbal 220. This example embodiment includes the components illustrated and described in the prior figures, e.g., FIG. 3. Also shown are components such as LEDs 410 on the aerial vehicle 110 that may be used to provide vehicle status related information. Also shown is a battery 440 as a part of the power subsystem 340 and an antenna 460 as a part of the communication subsystem 360.

The figure illustrates in an example embodiment that the flight controller 315 may be coupled with two electronic speed controllers 320. Each electronic speed controller 320 in this configuration drives two thrust motors 240 (via respective electronics of each thrust motor).

Also shown is a gimbal interface 430 that may communicatively couple the gimbal controller 330 with components of the EC system 310. In particular, the gimbal interface 430 may be communicatively coupled with the video link controller 345, the telemetric subsystem 335 (e.g., the GPS and the compass), and the antenna 460. The gimbal interface 430 may be used to feed this data to the gimbal controller 330. The gimbal controller 330 may use this data to adjust the camera mount 220. It is noted that the camera mount 220 can be, for example, a frame to secure a camera 450. The gimbal controller 330 may be communicative coupled with the camera 450 through one or more camera interface 350. The camera interface 350 can include camera communication interfaces such as universal serial bus (USB) or HDMI. The media captured by the camera 450, e.g., still images, video, audio, can be communicated back to the aerial vehicle 110 through the camera interface 350. Data, e.g., telemetric data from the telemetric subsystem 335, also can be sent via the camera interface 350 to the camera 450 to associate with video captured and stored on the camera 450.

Example Camera Architecture

Figure 5:
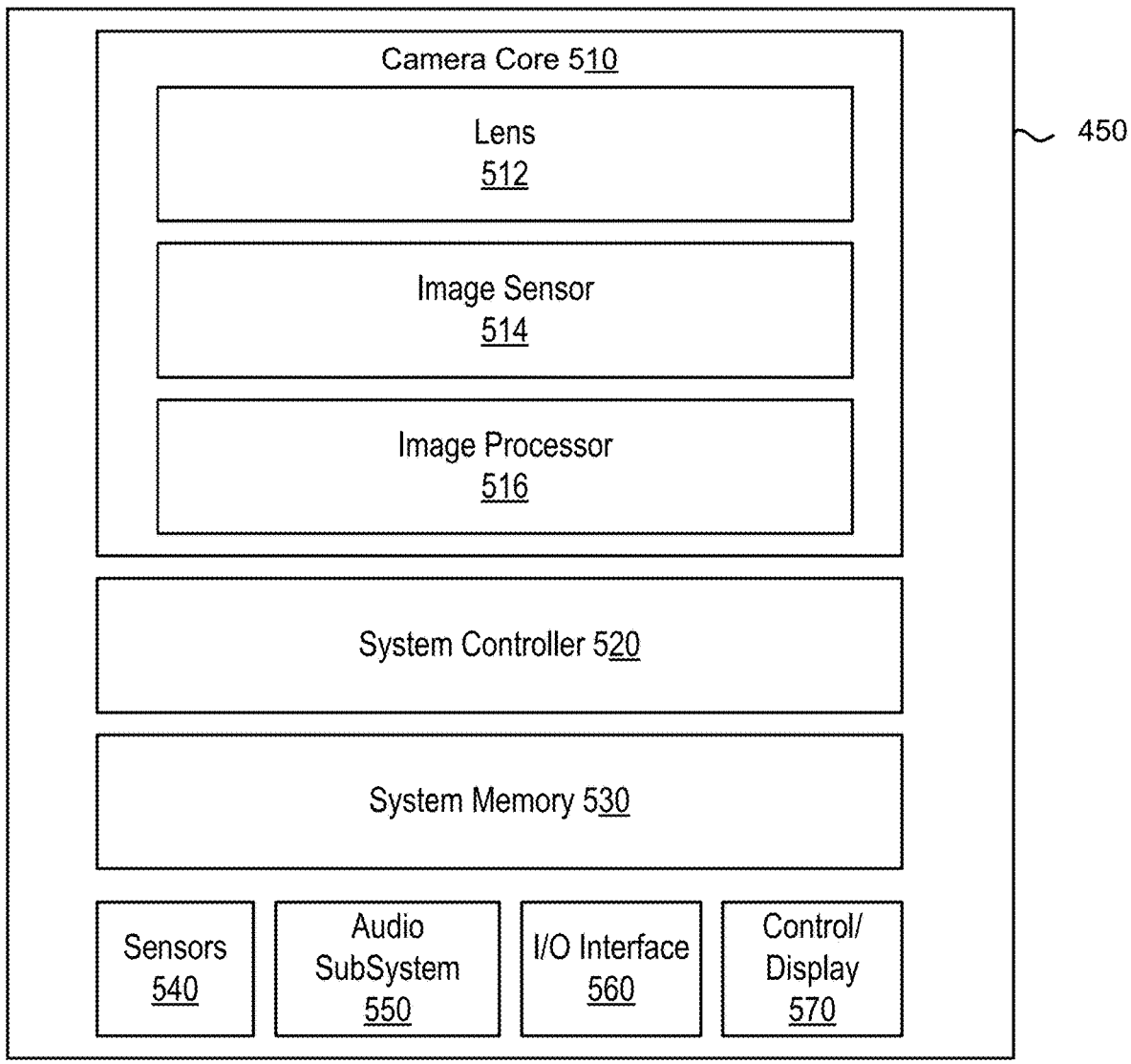
FIG. 5 illustrates a block diagram of an example camera architecture.

FIG. 5 illustrates a block diagram of an example camera architecture. The camera architecture 505 corresponds to an architecture for the camera, e.g., 450. Briefly referring back to the camera 450, it can include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. In one example embodiment, the camera 450 may be capable of capturing spherical or substantially spherical content. As used herein, spherical content may include still images or video having spherical or substantially spherical field of view. For example, in one embodiment, the camera 450 may capture video having a 360 degree field of view in the horizontal plane and a 180 degree field of view in the vertical plane. Alternatively, the camera 450 may capture substantially spherical images or video having less than 360 degrees in the horizontal direction and less than 180 degrees in the vertical direction (e.g., within 10% of the field of view associated with fully spherical content). In other embodiments, the camera 450 may capture images or video having a non-spherical wide angle field of view.

As described in greater detail below, the camera 450 can include sensors to capture metadata associated with video data, such as timing data, motion data, speed data, acceleration data, altitude data, GPS data, and the like. In a particular embodiment, location and/or time centric metadata (geographic location, time, speed, etc.) can be incorporated into a media file together with the captured content in order to track the location of the camera 450 over time. This metadata may be captured by the camera 450 itself or by another device (e.g., a mobile phone or the aerial vehicle 110 via the camera interface 430) proximate to the camera 450. In one embodiment, the metadata may be incorporated with the content stream by the camera 450 as the spherical content is being captured. In another embodiment, a metadata file separate from the video file may be captured (by the same capture device or a different capture device) and the two separate files can be combined or otherwise processed together in post-processing. It is noted that these sensors may be in addition to the sensors of the telemetric subsystem 335. In embodiments in which the camera 450 is integrated with the aerial vehicle 110, the camera need not necessarily have separate individual sensors, but rather could rely upon the sensors integrated with the aerial vehicle 110.

Referring now to the details of FIG. 5, it illustrates a block diagram of the camera architecture 505 of the camera 450, according to one example embodiment. In the illustrated embodiment, the camera 450 comprises a camera core 510 comprising a lens 512, an image sensor 514, and an image processor 516. The camera 450 may include a system controller 520 (e.g., a microcontroller or microprocessor) that controls the operation and functionality of the camera 450. The camera 450 also may include a system memory 530 that is configured to store executable computer instructions that, when executed by the system controller 520 and/or the image processors 516, may perform the camera functionalities described herein. In some example embodiments, a camera 450 may include multiple camera cores 510 to capture fields of view in different directions which may then be stitched together to form a cohesive image. For example, in an embodiment of a spherical camera system, the camera 450 may include two camera cores 510 each having a hemispherical or hyper hemispherical lens that each captures a hemispherical or hyper hemispherical field of view which are stitched together in post-processing to form a spherical image.

The lens 512 can be, for example, a wide angle lens, hemispherical, or hyper hemispherical lens that focuses light entering the lens to the image sensor 514 which captures images and/or video frames. The image sensor 514 may capture high-definition images having a resolution of, for example, 720p, 1080p, 4k, or higher. In one embodiment, spherical video is captured as a 5760 pixels by 2880 pixels with a 360 degree horizontal field of view and a 180 degree vertical field of view. For video, the image sensor 514 may capture video at frame rates of, for example, 30 frames per second, 60 frames per second, or higher. The image processor 516 performs one or more image processing functions of the captured images or video. For example, the image processor 516 may perform a Bayer transformation, demosaicing, noise reduction, image sharpening, image stabilization, rolling shutter artifact reduction, color space conversion, compression, or other in-camera processing functions. Processed images and video may be temporarily or persistently stored to system memory 530 and/or to a non-volatile storage, which may be in the form of internal storage or an external memory card.

An input/output (I/O) interface 560 transmits and receives data from various external devices. For example, the I/O interface 560 may facilitate the receiving or transmitting video or audio information through an I/O port. Examples of I/O ports or interfaces include USB ports, HDMI ports, Ethernet ports, audio ports, and the like. Furthermore, embodiments of the I/O interface 560 may include wireless ports that can accommodate wireless connections. Examples of wireless ports include Bluetooth, Wireless USB, Near Field Communication (NFC), and the like. The I/O interface 560 also may include an interface to synchronize the camera 450 with other cameras or with other external devices, such as a remote control, a second camera, a smartphone, a client device, or a video server.

A control/display subsystem 570 may include various control a display components associated with operation of the camera 450 including, for example, LED lights, a display, buttons, microphones, speakers, and the like. The audio subsystem 550 includes, for example, one or more microphones and one or more audio processors to capture and process audio data correlated with video capture. In one embodiment, the audio subsystem 550 may include a microphone array having two or microphones arranged to obtain directional audio signals.

Sensors 540 capture various metadata concurrently with, or separately from, video capture. For example, the sensors 540 may capture time-stamped location information based on a global positioning system (GPS) sensor, and/or an altimeter. Other sensors 540 may be used to detect and capture orientation of the camera 450 including, for example, an orientation sensor, an accelerometer, a gyroscope, or a magnetometer. Sensor data captured from the various sensors may be processed to generate other types of metadata. For example, sensor data from the accelerometer may be used to generate motion metadata, comprising velocity and/or acceleration vectors representative of motion of the camera 450.

Furthermore, sensor data from the aerial vehicle 110 and/or the gimbal 210/gimbal controller 330 may be used to generate orientation metadata describing the orientation of the camera 450. Sensor data from the GPS sensor provides GPS coordinates identifying the location of the camera 450, and the altimeter measures the altitude of the camera 450. In one embodiment, the sensors 540 are rigidly coupled to the camera 450 such that any motion, orientation or change in location experienced by the camera 450 is also experienced by the sensors 540. The sensors 540 furthermore may associates a time stamp representing when the data was captured by each sensor. In one embodiment, the sensors 540 automatically begin collecting sensor metadata when the camera 450 begins recording a video.

Example Remote Controller System

Figure 6:
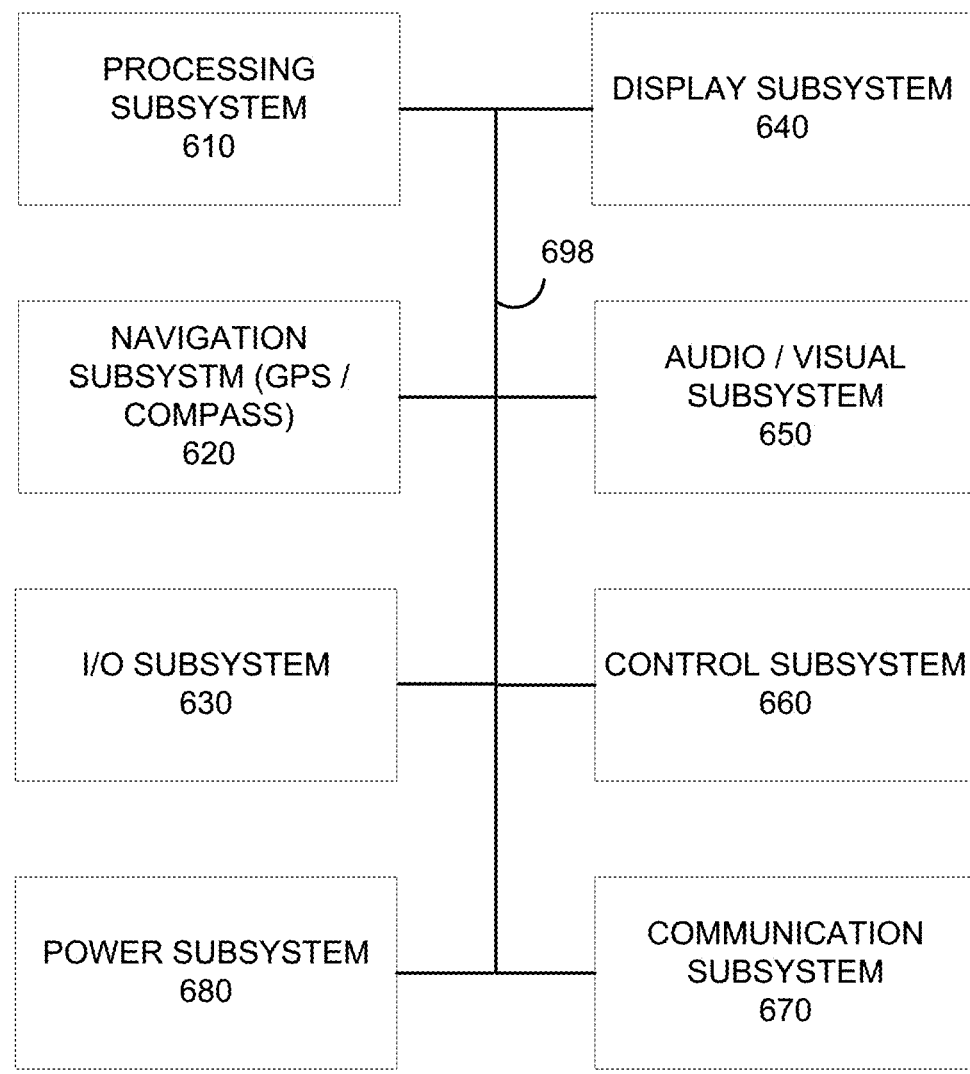
FIG. 6 illustrates a block diagram of an example remote control system of a remote controller.

FIG. 6 illustrates a block diagram of an example remote control system 605 of a remote controller, e.g., 120. The remote control system 605 includes a processing subsystem 610, a navigation subsystem 620, an input/output (I/O) subsystem 630, a display subsystem 640, an audio/visual (A/V) subsystem 650, a control subsystem 660, a communication subsystem 670, and a power subsystem 680. The subsystems are communicatively coupled through a data bus 690 and are powered, where necessary, through the power subsystem 680.

The processing subsystem 610 may be configured to provide the electronic processing infrastructure to execute firmware and software comprised of instructions. An example processing subsystem 610 is illustrated and further described in FIG. 14. The navigation subsystem 620 may include electronics, controls and interfaces for navigation instrumentation for the remote controller 120. The navigation subsystem 620 includes, for example, a global position system (GPS) and a compass. The GPS and compass may be used to track location of the remote controller 120 location, which can be helpful for the remote controller 120 and the aerial vehicle 110 to computationally understand location of each relative to the other.

The I/O subsystem 630 includes the input and output interfaces and electronic couplings to interface with devices that allow for transfer of information into or out of the remote controller 120. For example, the I/O subsystem 630 can a physical interface such as a universal serial bus (USB) or a media card (e.g., secure digital (SD)) slot. The I/O subsystem 630 also can be associated with the communication subsystems 670 to include a wireless interface such as Bluetooth. It is noted that in one example embodiment, the aerial vehicle 110 uses long range WiFi radio within the communication subsystem 670, but also may use a second WiFi radio or cellular data radio (as a part of the I/O subsystem 630) for connection other wireless data enabled devices, for example, smart phones, tablets, laptop or desktop computers, and wireless internet access points. Moreover, the I/O subsystem 630 also may include other wireless interfaces, e.g., Bluetooth, for communicatively coupling devices that are similarly wirelessly enabled for short range communications.

The display subsystem 640 may be configured to provide an interface, electronics, and display drivers for the screen 170 of the remote controller 120. The A/V subsystem 650 includes the interfaces, electronics, and drivers for an audio output (e.g., headphone jack or speakers) as well as visual indicators (e.g., LED lighting associated with, for example, the buttons 160, 165).

The control subsystem 660 may include electronic and control logic and firmware for operation with the control panels 150, 155, buttons 160, 165, and other control mechanisms on the remote controller 120.

The communication subsystem 670 may include electronics, firmware and interfaces for communications. The communications subsystem 670 can include one or more of wireless communication mechanisms such as WiFi (short and long range), long term evolution (LTE), 3G/4G/5G, and the like. The communication subsystem 670 also can include wired communication mechanisms such as Ethernet, USB, and HDMI.

The power subsystem 680 may include electronics, firmware and interfaces for providing power to the system. The power subsystem 680 includes direct current (DC) power sources (e.g., batteries), but also can be configured for alternating current (AC) power sources. The power subsystem 680 also includes power management processes for extending DC power source lifespan. It is noted that in some embodiments, the power subsystem 680 may be comprised of power management integrated circuit and a low power microprocessor for power regulation. The microprocessor in such embodiments is configured to provide very low power states to preserve battery, and ability to wake from low power states from such events as a button press or an on-board sensor (like a hall sensor) trigger.

Example Flight Plan Control System for Remote Contoller

Turning now to preparing an aerial vehicle, e.g., 110 for flight, the disclosed configuration includes mechanisms for programming the aerial vehicle 110 for flight through a remote controller, e.g., 120. The program uploaded to the aerial vehicle 110 may be a flight plan. The flight plan provides the aerial vehicle 110 with basic flight related parameters, even though the remote controller 120 may be used to provide overall control over the aerial vehicle 110.

Figure 7:
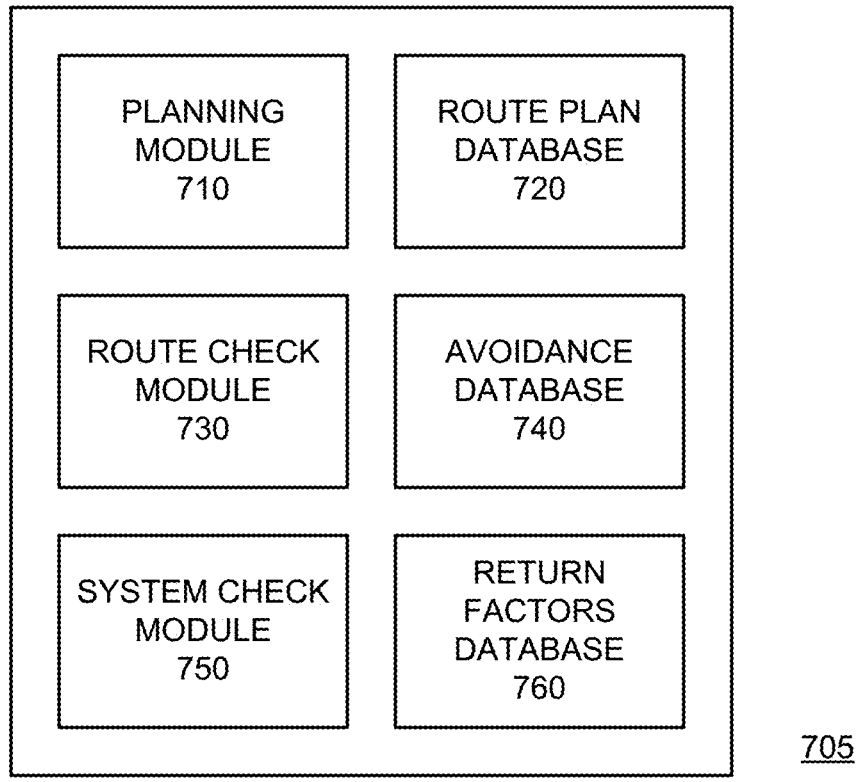
FIG. 7 illustrates a functional block diagram of an example flight plan control system for a remote controller.

FIG. 7 illustrates a functional block diagram of an example flight plan control system 705 for a remote controller, e.g., 120. The system 705 may include a planning module 710, a route plan database 720, a route check module 730, an avoidance database 740, a system check module 750 and a return factors database 760. It is noted that the modules may be embodied as software (including firmware) comprised on program code (or software or instructions) executable by the processing subsystem 610.

The flight plan control system 705 may be configured to provide flight (or route) planning tools that allow for preparing a flight plan of the aerial vehicle 110. The planning module 710 includes user interfaces displayed on the screen 170 of the remote controller 120 that allows for entering and viewing of information, such as flight path (how and where the aerial vehicle 110 will travel), maps (geographic information over where the aerial vehicle 110 will travel), environmental condition data (e.g., wind speed and direction), terrain condition data (e.g., locations of tall dense shrubs), and other information necessary for planning a flight of the aerial vehicle.

Figure 14:
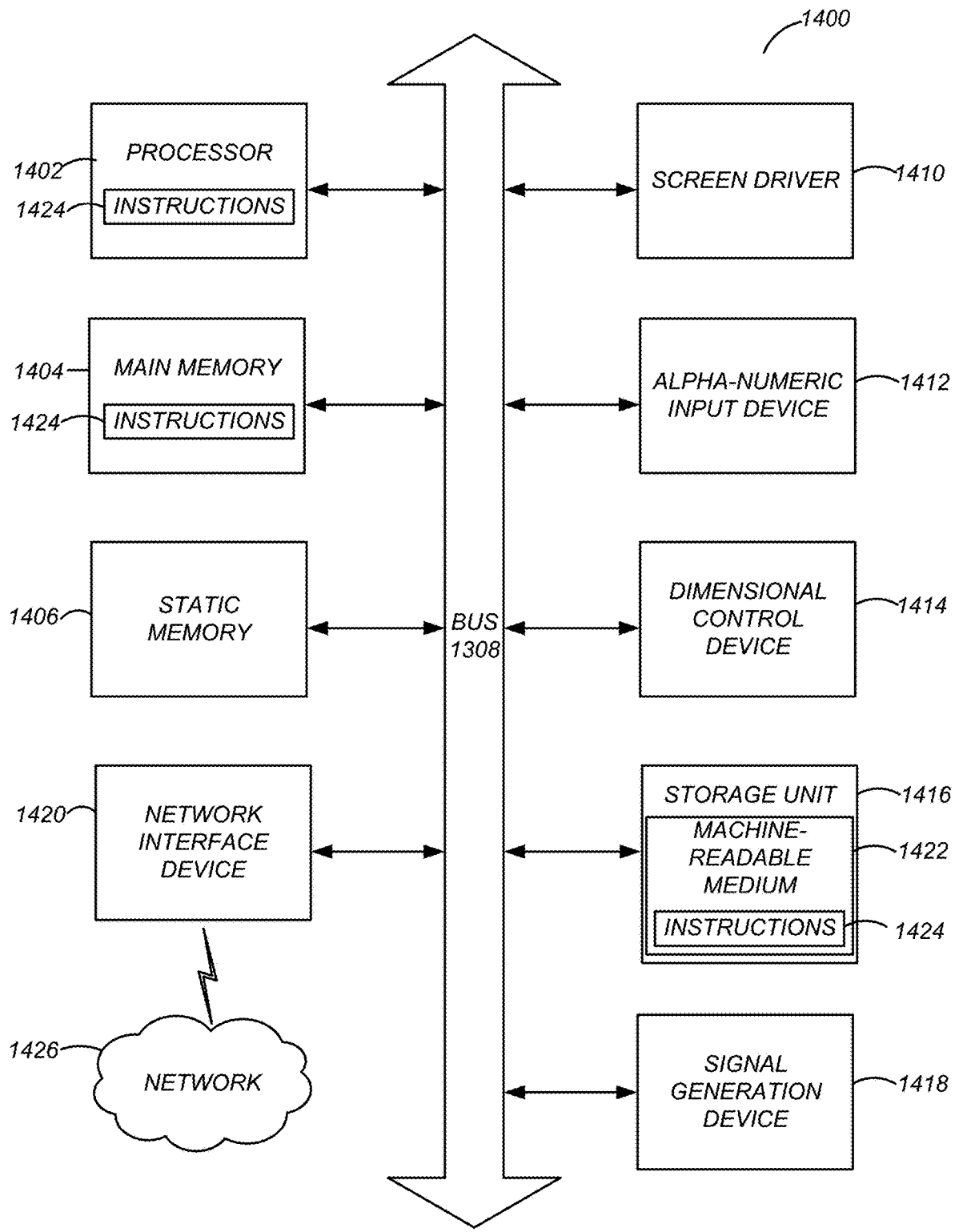
FIG. 14 illustrates an example machine for use with a system of the remote controlled aerial vehicle.

The route plan database 720 may provide a repository (e.g., that is part of a storage device such as an example storage device described with FIG. 14) for prepared flight plans to be stored. The route plan database 720 may store plans, either previously created on the remote controller 120 or uploaded into it (e.g., through the I/O subsystem 630). The stored plans can be retrieved from the route plan database 720 and edited as appropriate through the planning module 710.

The route plan database 720 also may store preplanned (pre-programmed) maneuvers for the aerial vehicle that can be retrieved and applied with a flight plan created through the planning module 720. For example, a "loop de loop" maneuver can be pre-stored and retrieved from the route plan database 720 and then applied to a flight plan over a mapped area (the map also can be stored in and retrieved from the route plan database 720) via the planning module 710. It is noted that the route plan can be configured to provide a predefined "band" (area or region where operation is permissible) within with the aerial vehicle is controlled through the remote controller 120.

The route check module 730 may be configured to conduct a check of the desired flight path to evaluate potential issues with the route planned. For example, the route check module 730 may be configured to identify particular factors such as terrain elevation that may be challenging for the aerial vehicle 110 to clear. The route check module 730 may check environment conditions along the route planned to provide information on potential challenges such as wind speed or direction.

The route check module 730 may also retrieve data from the avoidance database 740 for use in checking a particular planned route. The data stored in the avoidance database 740 may include data such as flight related restriction on terms of areas/boundaries for flight (e.g., no fly areas or no fly beyond a particular boundary (aerial restrictions)), altitude restrictions (e.g., no fly above a ceiling of some predefined altitude or height), proximity restrictions (e.g., power lines, vehicular traffic conditions, or crowds), obstacle locations (e.g., monuments, trees, etc.) and the like. The data retrieved from the avoidance database 740 may be used to compare against data collected from the sensors on the aerial vehicle 110 to see whether the collected data corresponds with, for example, a predefined condition, whether the collected data is within a predetermined range of parameters that is within an acceptable range of error, etc.

The route check module 730 also may include information corresponding to information on where the aerial vehicle 110 can or cannot set down. For example, the route check module 730 may incorporate in information where the aerial vehicle 110 cannot land ("no land zone"), for example, highways, bodies of water (e.g., pond, stream, rivers, lakes, ocean, etc.) or restricted areas. Some retrieved restrictions may be used to adjust the planned route before flight so that when the plan is uploaded into the aerial vehicle flight along a particular path is not allowed in terms of remote controller 120 control with flying in that path. Other retrieved restriction data from the avoidance database 740 can be stored with the route plan and also may be uploaded into the aerial vehicle 110 for use during the flight by the aerial vehicle 110. The stored information can be used to make route adjustments when detected, e.g., via the system check module 750 described below.

Referring back to the route check module 730, it also can be configured to alter or provide recommendations to alter the route plan to remove conditions in the flight plan path that may not be conducive for the aerial vehicle 110 to fly through. The altered or suggested path can be displayed through the planning module 710 on the screen 170 of the remote controller 120. The revised route can be further modified if so desired and checked again by the route check module 730 in an iterative process until the route is shown as clear for flight of the aerial vehicle 110.

The system check module 750 may be configured to communicate with the aerial vehicle, e.g., through the communication subsystem 670. The system check module 750 receives data from the aerial vehicle 110 corresponding to conditions corresponding to the aerial vehicle 110 or the surroundings within which the aerial vehicle 110 is operating. The system check module 750 can interface with the planning module 710 and route check module 730 to make route adjustments for the aerial vehicle 110 as it operates and moves along the planned route.

The planning module 710, and in some embodiments the route check module 730, also interface with the return factors database 760. The return factors database 760 stores return related data corresponding to when the aerial vehicle 110 should return to a predefined spot. This data can be stored with the route plan and uploaded into the aerial vehicle 110. The data also can be used by the system check module 750 to trigger an action for the aerial vehicle 110 to go to the return location. The return data can be data such as aerial vehicle 110 related data such as battery power (e.g., return if battery power below predefined threshold that would prevent return of the aerial vehicle 110) or mechanical condition (e.g., motor engine stall or burnout). The return data also can be environment data (e.g., wind speed in excess of a predefined threshold) or terrain data (e.g., tree density beyond predefined threshold). The return location can be predefined through the planning module 710 by providing, for example, GPS coordinate. Alternately, it can be the location of the remote controller 120. The aerial vehicle 110 may be configured to set down at or near its current location if the system check module 750 determines that the aerial vehicle 110 will not be able to return to the predefined location in view of the return data information received.

It is noted that the databases 720, 740, 760 of the system 705 may be updated and/or augmented. For example, where there may be a local WiFi or cellular data connection, e.g., through the I/O subsystem 630, the data gathered from sources such as the internet can be used to update the route plan database 720, the avoidance database 740, and the return factors database 760. Moreover, with such data communication, the databases can be updated in real-time so that information may be updated and utilized during flight. Further, the updated data can be transmitted to the communication subsystem 360 of the aerial vehicle 110 in real time to update route or return path information (further described below) as it becomes available.

Figure 9:
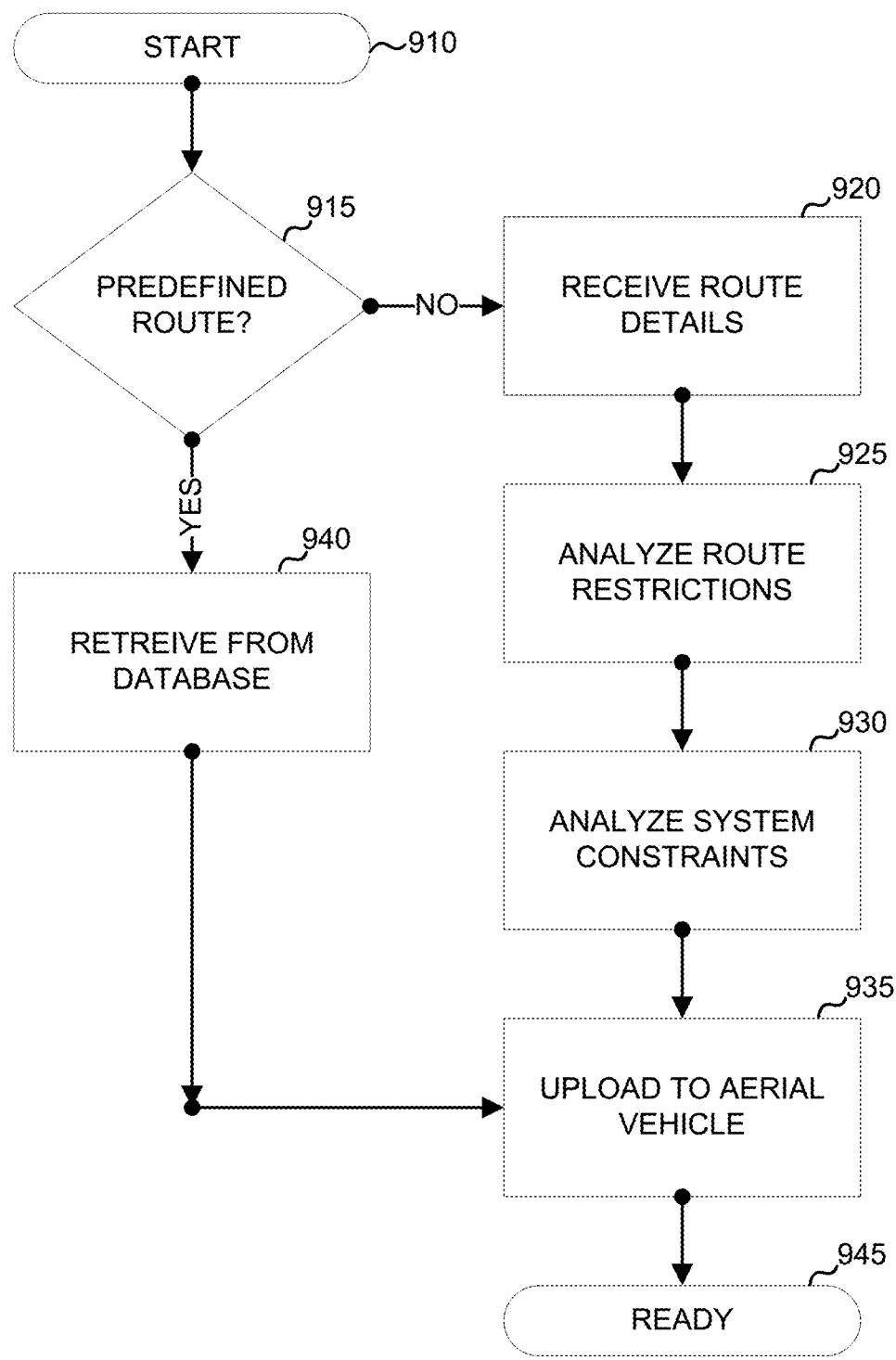
FIG. 9 illustrates a flow diagram for an example program path operation on a remote controller.
Figure 10:
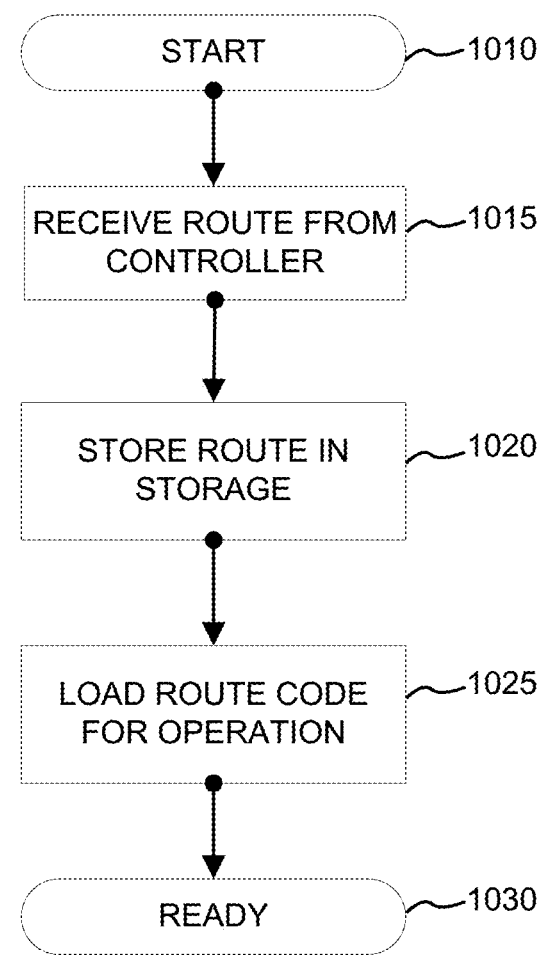
FIG. 10 illustrates a flow diagram for an example program path operation load on a remote controlled aerial vehicle.

Additional examples of route plan related configurations on a remote controller 120 are described with FIGS. 9 and 10. FIG. 9 illustrates a flow diagram for an example route plan programmed on a remote controller 120. The process starts 910 with the remote control system 605 determining 915 whether there is pre-defined flight route (or path). If not, the process receives flight route details 920 using, for example, the planning module 710 and route planning database 720. The process analyzes 925 route restrictions using, for example, the route check module 730 and avoidance database 740. The process also analyzes 930 system constraints through, for example, the avoidance database and system check module 750 (e.g., battery life left on aerial vehicle 110). The process uploads 935 the route details to the aerial vehicle 110. The route also may be stored the route plan database 720 before being ready for next actions 945.

If the process determines 915 that a predefined route will be used, that route plan can be retrieved from the route plan database 720. The retrieved route plan is uploaded 935 to the aerial vehicle 935. If adjustments are made to the retrieved route plan, the process may undertake the steps of analyzing 925 the route restrictions and analyzing the system constraints 930 before being uploaded to the aerial vehicle 935. The processes of analyzing 925, 930 may be iterative before upload and before being ready 945 for the next actions.

Turning to FIG. 10, it illustrates a flow diagram for an example program load operation onto the aerial vehicle 110. The process starts 1010 with the flight controller 315 processing subsystem receiving 1015 the route information from the remote controller 120. The received route information is stored 1020 in a storage (e.g., memory and/or flash storage). When ready for execution, the process retrieves the stored route information and loads 1025 the route information and corresponding executable code for execution by the flight controller 315 processing subsystem. The aerial vehicle 110 is ready 1030 for flight using the loaded route information.

Example Flight Control System for Aerial Vehicle

Figure 8:
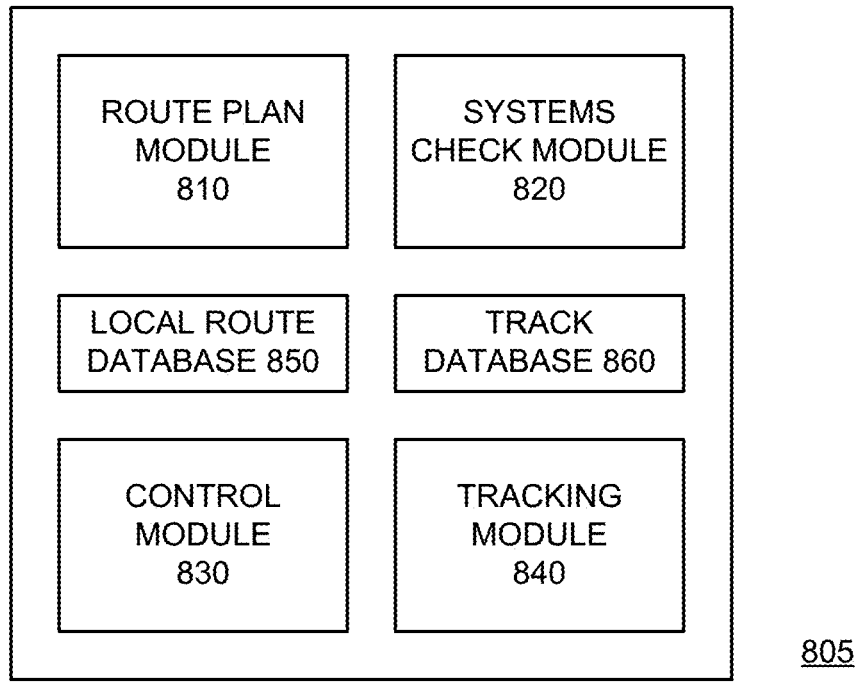
FIG. 8 illustrates a functional block diagram of an example flight plan control system for an remote controlled aerial vehicle.

Turning now to FIG. 8, it illustrates a functional block diagram of an example flight control system 805 for a remote controlled aerial vehicle, e.g., 110. The flight control system 805 may include a route plan module 810, a systems check module 820, a control module 830, tracking module 840, a local route database 850 and a tracking database 860. It is noted that the modules of the flight control system 805 may be embodied as software (including firmware) comprised on program code (or software or instructions) stored in a storage medium and executable by the flight controller 315 processing subsystem.

The route plan module 810 may be configured to execute the route for the aerial vehicle 110. The route plan may be one uploaded from the remote controller 120 as described with FIG. 10. The route plan may be transmitted via the communication subsystem 670 of the remote controller 120 and received by the communication subsystem 360 of the aerial vehicle 110. The route plan can be configured to provide a predefined "band" within with the aerial vehicle is controlled. The systems check module 820 may be configured to monitor operational systems of the aerial vehicle 110 and flight environment and terrain sensor data captured by the aerial vehicle 110 when in operation. The operational systems information may include information related to flight of the aerial vehicle 110, for example, remaining battery power, mechanical operation, and electrical operation. Flight environment and terrain sensor data corresponds to data from the telemetric subsystem 335 of the aerial vehicle 110, for example, temperature, moisture, wind direction, object detection as well as altitude and direction (e.g., heading) data.

The control module 830 may be configured to control operation of the aerial vehicle 110 when it is in flight. The control module 830 may be configured to receive control commands from the remote controller 120. The received commands may be, for example, generated via the control panels 150, 155 and transmitted from the communication subsystem 670 of the remote controller 120 for receiving and processing at the aerial vehicle 110 via its communication subsystem 360 and flight controller 315. The received commands may be used by the control module 830 to manipulate the appropriate electrical and mechanical subsystems of the aerial vehicle 110 to carry out the control desired.

The control module 830 also may interface with the route plan module 810 and the systems check module 820 to ensure that the controls executed are within the permissible parameter of the route (or path) provided by the route plan module 810. Further, when an aerial vehicle 110 is in flight, there may be instances in which early detection of potential problems may be beneficial so that course (including flight) modifications can be taken when necessary and feasible. The control module 830 also may make course changes in view of receiving information from the systems check module 820 that may indicate that such course correction is necessary, for example, to navigate around an object detected by the telemetric subsystem 335 or picked up and analyzed from the camera 450. Other example course changes may occur due to wind levels exceeding a threshold at a particular altitude so that the aerial vehicle may move to a lower altitude where wind may be less of an issue despite the control information received from the remote controller 120. In making these changes, the control module 830 may work with the tracking module 860 to update the local route database 850 to identify location of objects or identify areas of flight that would be identified for avoidance for other reasons (e.g., whether conditions, electronic interference, etc.) for tracking by the tracking module 840 and for later download to an avoidance database, e.g., 740.

The tracking module 840 may be configured to track the flight of the aerial vehicle 840 (e.g., data corresponding to "clear" path of flying). The tracking module 840 also may store this information in the track database 860 and may store information in the local route database 850. The tracking module 840 may be used to retrieve the route the aerial vehicle 110 actually took and use that data to track back to a particular location. This may be of particular interest in situations in which the aerial vehicle 110 needs to be set down (e.g., land) as quick as possible and/or execute a return path. For example, if the systems check module 820 detects an impending power, electrical or mechanical issue that may affect further flying of the aerial vehicle 110, it may instruct the control module 830 to configure itself into an override mode. In the override mode, the control module 830 now limits or cuts off the control information received from the remote controller 120. The control module 830 checks with the tracking module 840 on a return path for the aerial vehicle 110 to identify a location where the aerial vehicle 110 can be set down as quickly as possible based on data from the systems control module 820, e.g., amount of battery power remaining and/or execute a return path. For example, upon executing a return path, the control module 830 may determine that the battery power left may not allow for return to a predefined location and may instead need to land somewhere along the clear path.

Figure 11:
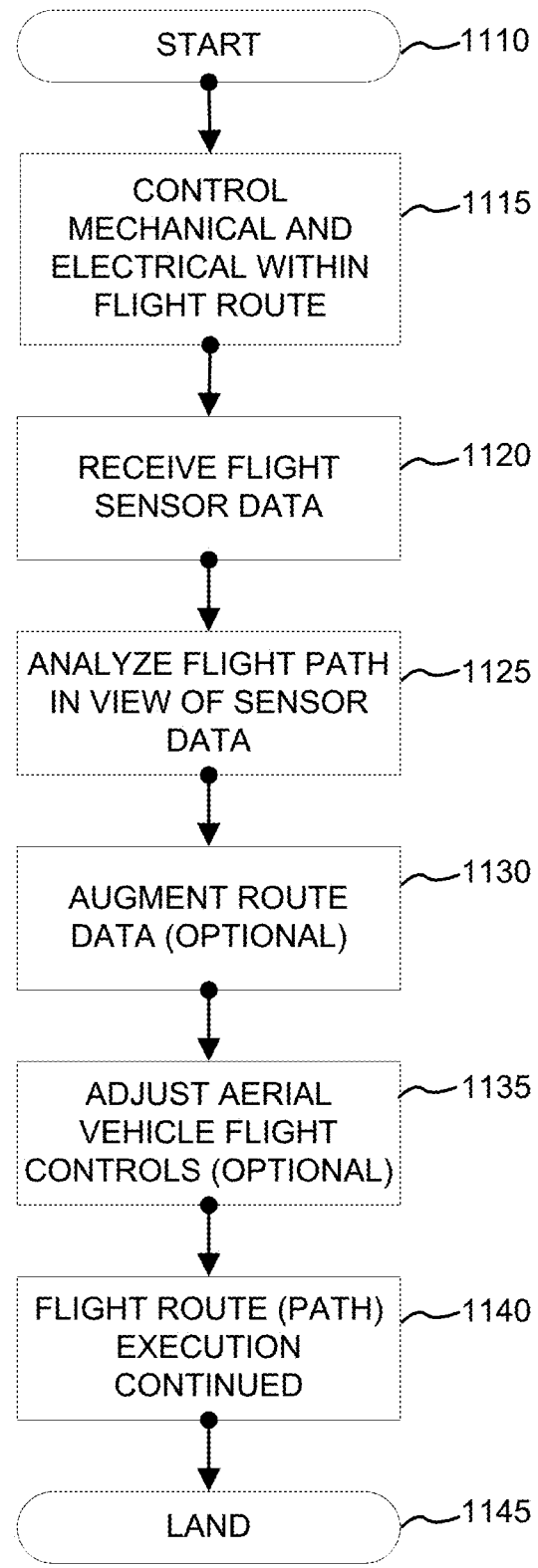
FIG. 11 illustrates a flow diagram for an example program path operation on a remote controlled aerial vehicle.

FIG. 11 provides an example of additional details for flight control operation on the aerial vehicle 110. In particular, FIG. 11 illustrates a flow diagram for an example operation on the aerial vehicle 110. The process starts 1110 with control information being received from the remote controller 120 through the communication subsystem 360 of the aerial vehicle 110. The control information is processed by the flight controller 315 to control 1115 the mechanical and electrical components of the aerial vehicle within the context of the programmed flight route. The telemetric subsystem 335 receives 1120 flight data information from sensors on board the aerial vehicle 315. This data is analyzed 1125 by the systems check module 820. The control module 830 may augment 1130 the analyzed data based on other information to modify the route, e.g., detection of an object by the telemetric subsystem 335 or image analysis of an image captured by the camera 450. In such instances the aerial vehicle 110 flight controls may be adjusted 1135 by the control module 830. When the flight path is completed 1140, the aerial vehicle may continue to fly within the parameters of system operation and flight route (or path) until the aerial vehicle is landed 1145. It is noted that the aerial vehicle 110 will not land within locations predefined as "no land zones." In such situations, a user of the remote controller 120 will continue to fly the aerial vehicle 110 to an area where landing 1145 is permitted.

Example Return Path Operation on Aerial Vehicle

As noted previously, there may be instances in which the aerial vehicle 110 may need to execute a return path. For example, operational conditions on the aerial vehicle 110 or a signal of return to home from the remote controller 120 may trigger a return path. On the aerial vehicle 110, the route plan module 810, control module 830 and/or tracking module 840 may be configured to provide a return path. The return path may have been preprogrammed from the flight plan, but thereafter modified with information picked up during flight of the aerial vehicle 110 and stored during flight. For example, during flight, the sensors on the aerial vehicle 110 may detect obstacles that should be avoided, but were in the pre-programmed return path. The detected obstacles and/or corresponding location data (e.g., GPS coordinates or points) of that obstacle is stored in the local route database 850. When the route plan module 810, control module 830 and/or tracking module 840 execute the return path operation on the aerial vehicle 110, the return path program is retrieved, data is extracted corresponding to obstacles (or other avoidance data) determined to be in the return path that were detected and stored during flight, the return path program is revised to adjust for those obstacles (e.g., changes flight path to clear object), and the modified return path is executed so that the obstacles are avoided on the return path.

The disclosed configuration beneficially implements an intelligent return to home behavior for the aerial vehicle 110. The return to home configuration may use a return path that is a direct from a current location to a predefined location. Alternately, or in addition, the direct route may incorporate in obstacle avoidance. By way of example, assume during flight the aerial vehicle 110 flies around a tree. This data, for example, location data, for the fly around may be stored in the aerial vehicle 110. Later, if a "return to home" (or "come home") button is selected on the remote controller 120, the aerial vehicle 110 return path tracks back along the direct route, but avoids flying directly into a tree, which is identified as an obstacle. Hence, the disclosed configuration return path can track back along what may be a clear path on the way back because such path avoided obstacles. In addition, the clear path may be direct path from a current location to a predetermined location (e.g., an initial take off location and/or initial location where data was captured) and may avoid redundant points along the route (e.g., multiple passes around a tree or building). The clear path may be saved within the aerial vehicle. In some example embodiments, in addition to obstacle avoidance, the return path program may use a direct route back to the predefined location to land or a place to land along that route that is determined to be clear. Landing at a place other than the predefined location may be due to other factors coming into consideration, for example, if battery power is insufficient to return to predefined location or mechanical integrity would prevent return to predefined location.

The disclosed configuration may reduce or remove aspects of flight behavior of the aerial vehicle that would be unnecessary for a return path. For example if the aerial vehicle 110 flew several loops around a tree, it may be undesirable to backtrack all of the loops when on a return path. Accordingly, the aerial vehicle 110 is configured to mark areas as "clear" (i.e., areas that are clear can then be identified through "clear breadcrumbs") as the aerial vehicle 110 is in flight. The clear path may be generated, for example, by removing location data (e.g., GPS) of the tracked flight path that may be redundant and/or accounting for obstacle data that may have been collected so as to avoid those obstacles. Further, it may be a direct flight path from a current location of the aerial vehicle to a predetermined location (e.g., initial take off location). The data corresponding to "clear" can be assembled into a graph for use in a return path. Thereafter, if the aerial vehicle 110 needs to come back (e.g., execute a return path) to the starting location the aerial vehicle 110 can take the shortest path through the graph of the cleared areas. This information can be stored and used through the control module 830 and/or the tracking module 840. Hence, if the aerial vehicle 110 flew several loops and figure eights and they intersect, the control module 840 can make connections at those points, build a graph corresponding to the points in that flight, and take a shortest path through cleared area back to a return point, for example, by removing redundant location data collected along the flight path. The process also may use an initial take off location of the aerial vehicle (e.g., where the aerial vehicle started flying from) as the return location.

Figure 12:
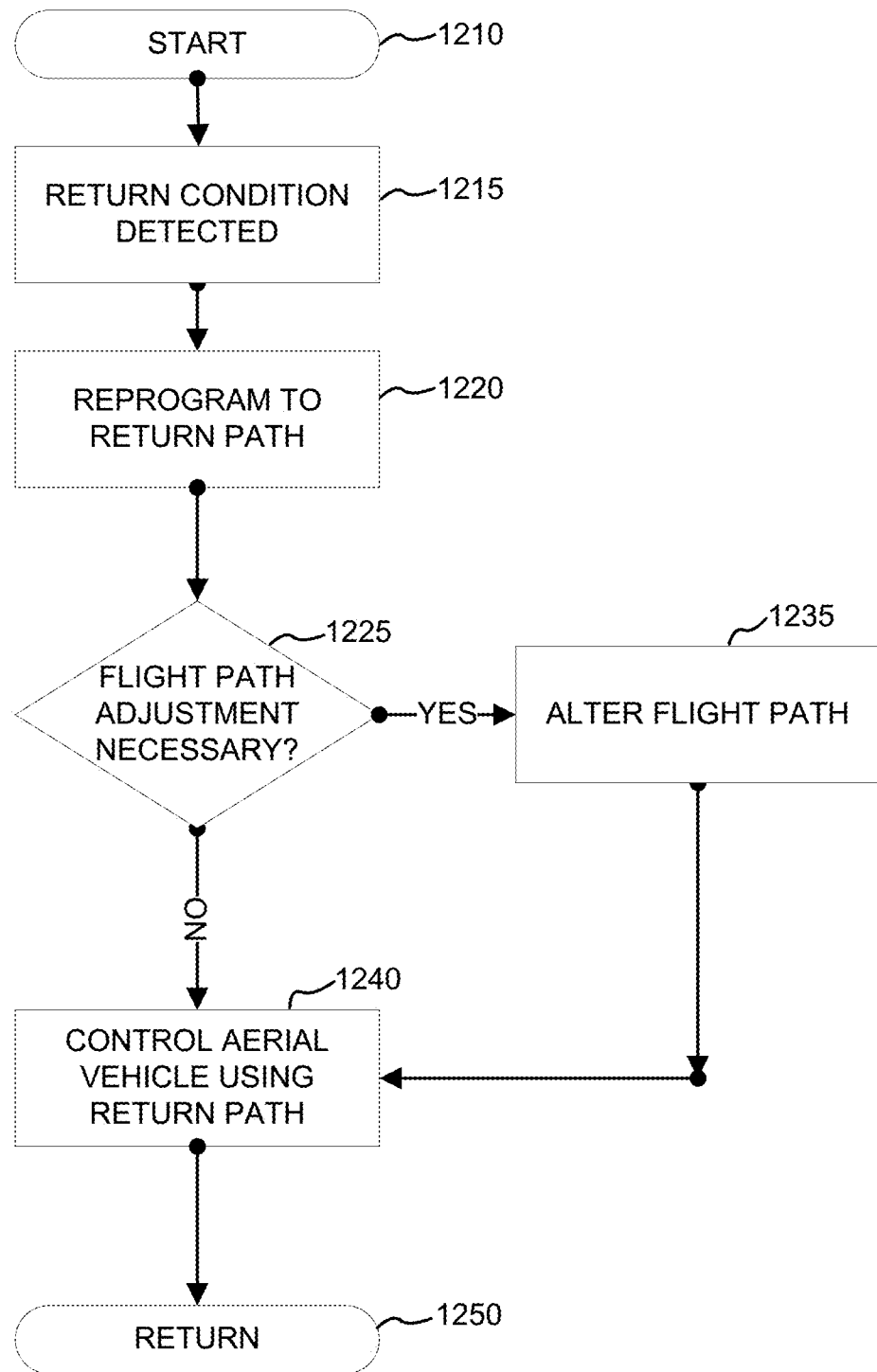
FIG. 12 illustrates a flow diagram for an example return path operation on a remote controlled aerial vehicle.

FIG. 12 illustrates a flow diagram for an example return path operation on a remote controlled aerial vehicle 110. The return path may be executed due to voluntary action, e.g., user selection of the return button 165 on the remote controller 120, or through involuntary action. Involuntary actions may include system related issue on the aerial vehicle 110, for example, low battery power or mechanical or electrical issues. The involuntary actions also may be triggered from sources such as location information or environmental information such as flying being a defined boundary or area, climatic issues (wind) or physical considerations such as object density. The aerial vehicle monitoring may be set up through the return factors database 760 and monitored for triggering of a return condition through the system check module 820, which can work in conjunction with the control module 830 to trigger a return mode.

In this example, process starts 1210 by detection 1215 of a return condition, for example, the systems check module 820. The control module 830, in conjunction with the route plan module 810 triggers a reprogramming 1220 of the aerial vehicle to now follow a return path. The control module 830 may work in conjunction with the route plan module 810, which may have preprogrammed coordinates of a return location, and/or the tracking module 840, which includes information on possible return path accounting for potential obstacles as may have been logged in the track database 860 during flight of the aerial vehicle 110. It is noted that in some embodiments the aerial vehicle 110 also may track "clear" areas during flight and store those locations. Thereafter if a return path is triggered, either manually or automatically, the "cleared" location data points are retrieved to generate a return flight path that the control module 830 can execute. This configuration may be beneficial, for example, if no return path is programmed or circumstances do not allow for return to precise "home" location.

As the return flight path is executed and the aerial vehicle 110 can be changed to operate in a return to home mode. The control module 830 may override control information arriving from the remote controller 120 and engage in an autopilot to navigate to the location pre-defined with the return to home. If there are flight adjustments 1225, the process may alter the flight path according to information stored and processed by the tracking module 840 and the track database 860 and local route database 850. The control module 830 may be configured to control 1240 the aerial vehicle back to the return location 1250. The return location 1250 may be identified in the route plan module 810 (original route plan may include coordinates for return location), or may use the location of the remote controller 120 (using its GPS location as a tracked beacon), or may identify an intermediate point as determined through the local route database 850 and/or the track database 860 in conjunction with the tracking module 840 and the route plan module 810.

It is noted that other operational scenarios also may trigger a return flight path. For example, the systems check module 820 may closely monitor maintenance of a communication link between the communications subsystem 360 of the aerial vehicle 110 and the communication subsystem 670 of the remote controller 120. A loss of a communication link between the communications subsystem 360 of the aerial vehicle 110 and the communication subsystem 670 of the remote controller 120 may be indicative of a need to trigger a return path. In this example, the system can be configured so that if communication link has been severed, the systems check module 820 notifies the control module 830 to try to reestablish the communication link. If the communication link is not established within a predefined number of tries or a predefined time period, the control module 830 will trigger the start of the return path as described above.

Remote Controller User Interface Example

Figure 13:
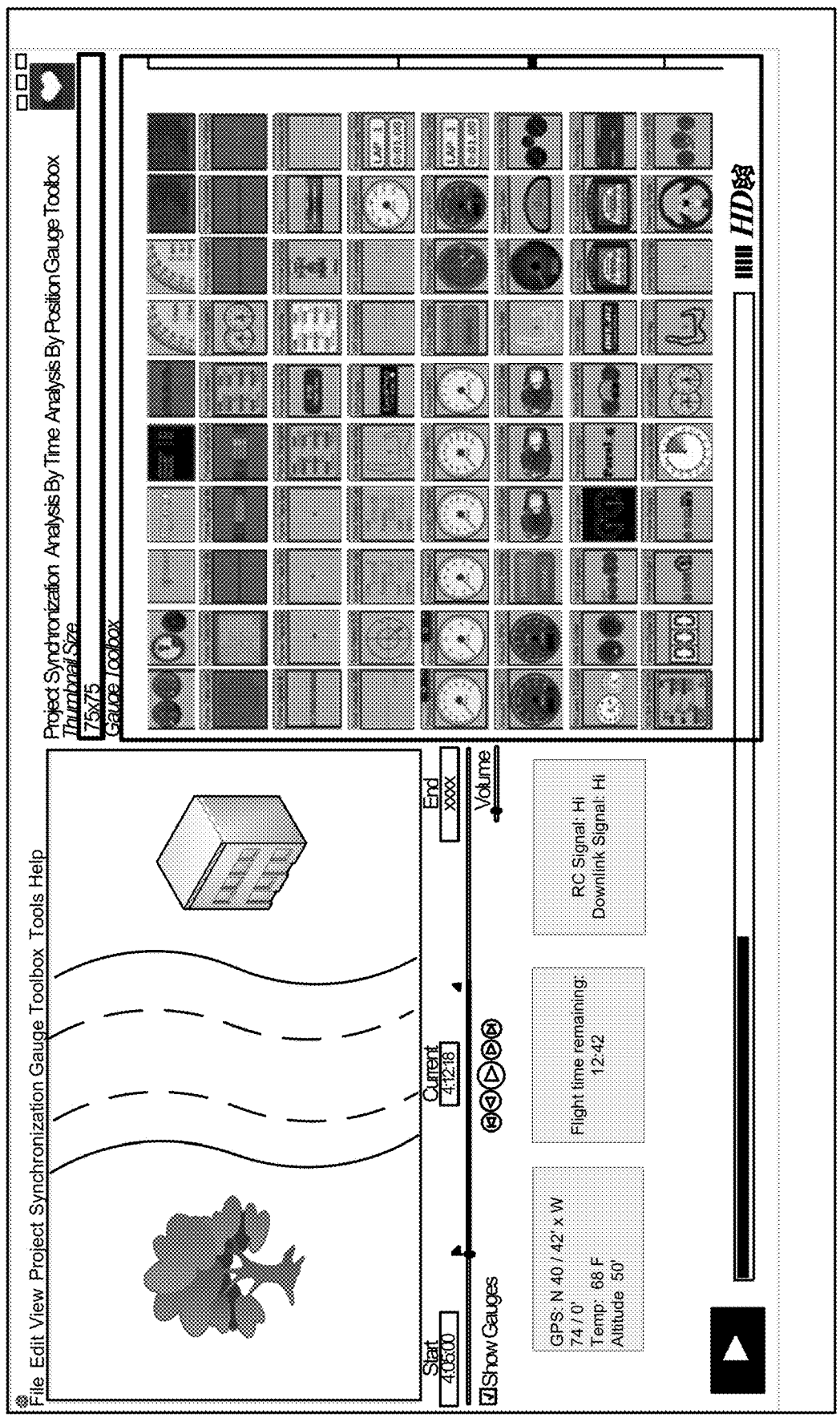
FIG. 13 illustrates an example user interface for a remote controller.

FIG. 13 illustrates an example user interface 1305 for use with the remote controller 120. The user interface 1305 is configured for display on the screen 170 of the remote controller 120. In this example, the user interface 1305 corresponds to a "dashboard" for the aerial vehicle 110. In one embodiment, the remote controller 120 may receive, e.g., via the I/O subsystem 630 and/or communications subsystem 670, sensor data logged by the telemetric subsystem 335 (and transmitted via the communication subsystem 360) of the aerial vehicle 110 as it is in flight. In one example embodiment, the aerial vehicle 110 can incorporate the telemetric (or sensor) data with video that is transmitted back to the remote controller 120 in real time. The received telemetric data is extracted from the video data stream and incorporate into predefine templates for display with the video on the screen 170 of the remote controller 120. The telemetric data also may be transmitted separate from the video from the aerial vehicle 110 to the remote controller 120. Synchronization methods such as time and/or location information can be used to synchronize the telemetric data with the video at the remote controller 120. This example configuration allows a user, e.g., operator, of the remote controller 120 to see where the aerial vehicle 110 is flying along with corresponding telemetric data associated with the aerial vehicle 110 at that point in the flight. Further, if the user is not interested in telemetric data being displayed real-time, the data can still be received and later applied for playback with the templates applied to the video.

The predefine templates can correspond with "gauges" that provide a visual representation of speed, altitude, and charts, e.g., as a speedometer, altitude chart, and a terrain map. The populated templates, which may appear as gauges on screen 170 of the remote controller 120, can further be shared, e.g., via social media, and or saved for later retrieval and use. For example, a user may share a gauge with another user by selecting a gauge (or a set of gauges) for export. Export can be initiated by clicking the appropriate export button, or a drag and drop of the gauge(s). A file with a predefined extension will be created at the desired location. The gauge to be selected and be structured with a runtime version of the gauge or can play the gauge back through software that can read the file extension.

Example Machine Architecture

As has been noted, the remote controlled aerial vehicle 110 can be remotely controlled from the remote controller 120. The aerial vehicle 110 and the remote controller 120 are machines that that be configured operated using software. FIG. 13 is a block diagram illustrating components of an example machine able to read instructions from a machine-readable medium and execute them in one or more processors (or controllers). All or portions of the example machine described in FIG. 14 can be used with the aerial vehicle 110 or the remote controller 120 and/or other parts of a system that interfaces with the aerial vehicle 110 and/or remote controller 120.

In FIG. 14 there is a diagrammatic representation of a machine in the example form of a computer system 1400. The computer system 1400 can be used to execute instructions 1424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine in this example is a handheld controller to control the remote controlled aerial vehicle, e.g., 110. However, the architecture described may be applicable to other computer systems that operate in the system of the remote controlled aerial vehicle, e.g., 110, with camera, e.g., 450, and mounting configuration, e.g., in setting up a local positioning system. These other example computer systems include a server computer, a client computer, a personal computer (PC), a tablet PC, a smartphone, an internet of things (IoT) appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes one or more processing units (generally processor 1402). The processor 1402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1400 also includes a main memory 1404. The computer system may include a storage unit 1416. The processor 102, memory 1404 and the storage unit 1416 communicate via a bus 1408.

The computer system 1406 may include a static memory 1406, a screen driver 1410 (e.g., to drive a screen, e.g., 170, such as plasma display panel (PDP), a liquid crystal display (LCD), or a projector). The computer system 1400 may also include input/output devices, e.g., an alphanumeric input device 1412 (e.g., a keyboard), a dimensional (e.g., 2-D or 3-D) control device 1414 (e.g., a mouse, a trackball, a joystick, a motion sensor, or other pointing instrument), a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 may be transmitted or received over a network 1426 via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store the instructions 1424. The term "machine-readable medium" shall also be taken to include any medium that is capable of storing instructions 1424 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

The disclosed configuration beneficially executes detects conditions in an aerial vehicle that automatically triggers a return path for having the aerial vehicle return or set down in a predefined location. Moreover, the disclosed configurations also can apply to other vehicles to automatically detect and trigger a return path Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described within FIGS. 3-13. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1402, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Use of the "a" or "an" may be employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for automatically detecting and executing a return path for a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method, comprising:
   receiving a video data stream captured by a camera of an aerial vehicle;
   synchronizing telemetric data and the video data stream; and
   displaying the synchronized telemetric data, the synchronized video data stream, and one or more applications associated with the aerial vehicle, the displaying via a user interface of a remote controller associated with the aerial vehicle, the user interface including a selectable option to interface with at least one of the synchronized telemetric data, the synchronized video data stream, or the one or more applications.

2. The method of claim 1, wherein the video data stream is captured by the camera while the aerial vehicle is executing a flight path.

3. The method of claim 2, wherein at least a portion of the video data stream corresponds to an avoidance of one or more obstacles detected by the aerial vehicle along the flight path.

4. The method of claim 3, wherein the flight path is a modified flight path.

5. The method of claim 4, wherein the modified flight path is generated by the aerial vehicle based on each location of the one or more obstacles and based on one or more redundant routes that trace around the one or more obstacles.

6. The method of claim 1, wherein the user interface is configured based on a predefined template that includes the selectable option.

7. The method of claim 1, wherein the one or more applications include one or more gauges.

8. The method of claim 1, further comprising:
   receiving an indication that one or more sensors of the aerial vehicle has detected a predefined condition.

9. The method of claim 8, wherein the predefined condition includes at least one of a structural condition of a mechanical component of the aerial vehicle or an operational condition of an electronic component of the aerial vehicle.

10. A system, comprising:
    a processor; and
    a memory including instructions that, when executed by the processor, cause the processor to:
       receive a video data stream captured by a camera of an aerial vehicle, the video data stream being captured by the camera while the aerial vehicle is executing a flight path;
       synchronize telemetric data and the video data stream; and
       display the synchronized telemetric data, the synchronized video data stream, and one or more applications associated with the aerial vehicle, the displaying via a user interface of a remote controller associated with the aerial vehicle, the user interface including a selectable option to interface with at least one of the synchronized telemetric data, the synchronized video data stream, or the one or more applications.

11. The system of claim 10, wherein at least a portion of the video data stream corresponds to an avoidance of one or more obstacles detected by the aerial vehicle along the flight path.

12. The system of claim 11, wherein the flight path is a modified flight path that is generated by the aerial vehicle based on each location of the one or more obstacles and based on one or more redundant routes that trace around the one or more obstacles.

13. The system of claim 10, wherein the user interface is configured based on a predefined template that includes the selectable option.

14. The system of claim 10, wherein the one or more applications include one or more gauges.

15. The system of claim 10, further including instructions that, when executed by the processor, cause the processor to:
receive an indication that one or more sensors of the aerial vehicle has detected a predefined condition, the predefined condition including at least one of a structural condition of a mechanical component of the aerial vehicle or an operational condition of an electronic component of the aerial vehicle.

16. A non-transitory computer readable storage medium comprising instructions that, when executed by a processor, cause the processor to:
receive a video data stream captured by a camera of an aerial vehicle, the video data stream being captured by the camera while the aerial vehicle is executing a flight path, at least a portion of the video data stream corresponding to an avoidance of one or more obstacles detected by the aerial vehicle along the flight path;
synchronize telemetric data and the video data stream; and
display the synchronized telemetric data, the synchronized video data stream, and one or more applications associated with the aerial vehicle, the displaying via a user interface of a remote controller associated with the aerial vehicle, the user interface including a selectable option to interface with at least one of the synchronized telemetric data, the synchronized video data stream, or the one or more applications.

17. The non-transitory computer readable storage medium of claim 16, wherein the flight path is a modified flight path that is generated by the aerial vehicle based on each location of the one or more obstacles and based on one or more redundant routes that trace around the one or more obstacles.

18. The non-transitory computer readable storage medium of claim 16, wherein the user interface is configured based on a predefined template that includes the selectable option.

19. The non-transitory computer readable storage medium of claim 16, wherein the one or more applications include one or more gauges.

20. The non-transitory computer readable storage medium of claim 16, further including instructions that, when executed by the processor, cause the processor to:
receive an indication that one or more sensors of the aerial vehicle has detected a predefined condition, the predefined condition including at least one of a structural condition of a mechanical component of the aerial vehicle or an operational condition of an electronic component of the aerial vehicle.

* * * * *